April 29, 1941. H. FROMM 2,240,213
HOMOGENIZER
Filed Dec. 2, 1939 2 Sheets-Sheet 1
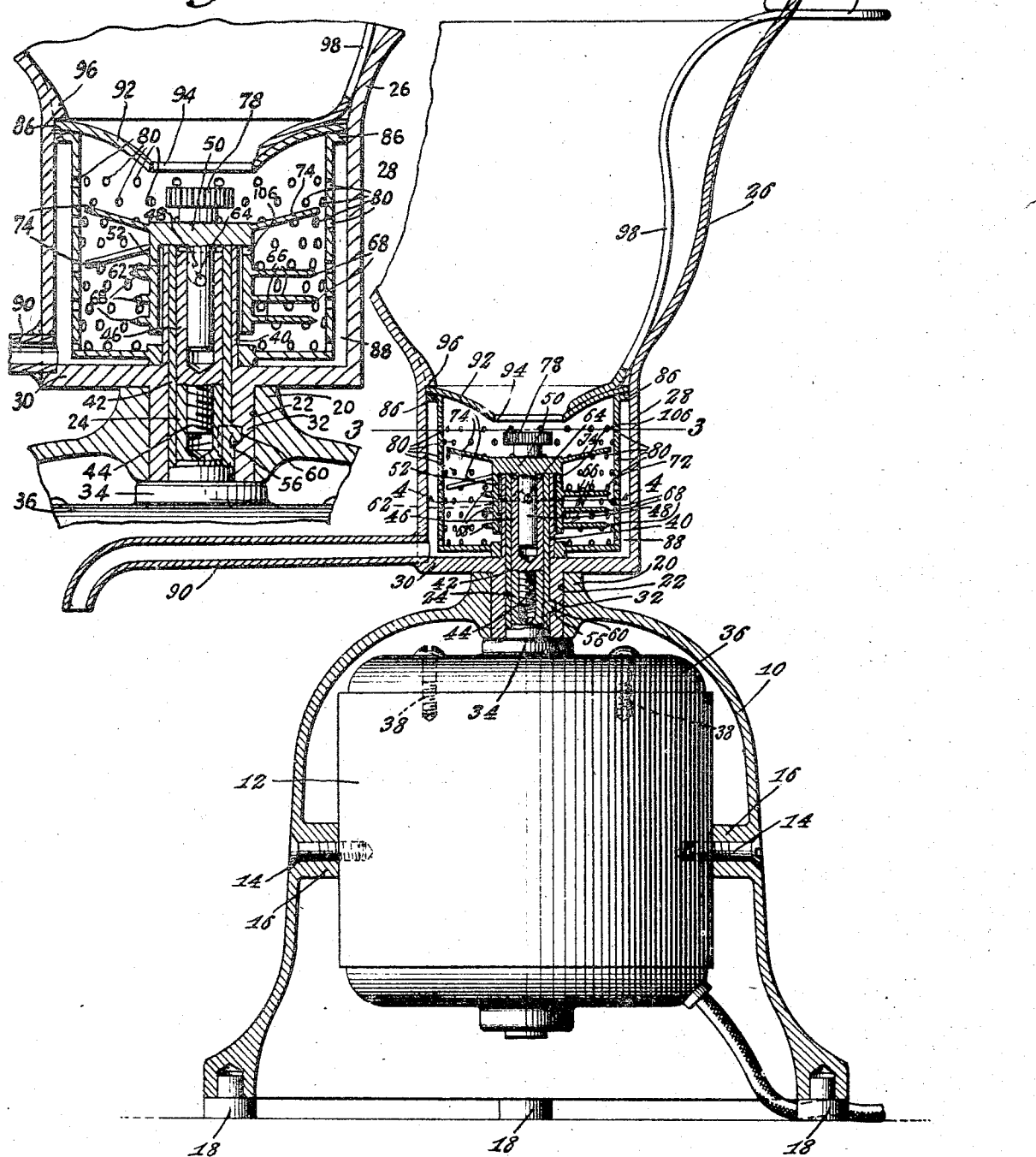
Herbert Fromm, INVENTOR
BY Victor J. Evans & Co.
ATTORNEYS April 29, 1941.　　　　H. FROMM　　　　2,240,213
HOMOGENIZER
Filed Dec. 2, 1939　　　2 Sheets-Sheet 2
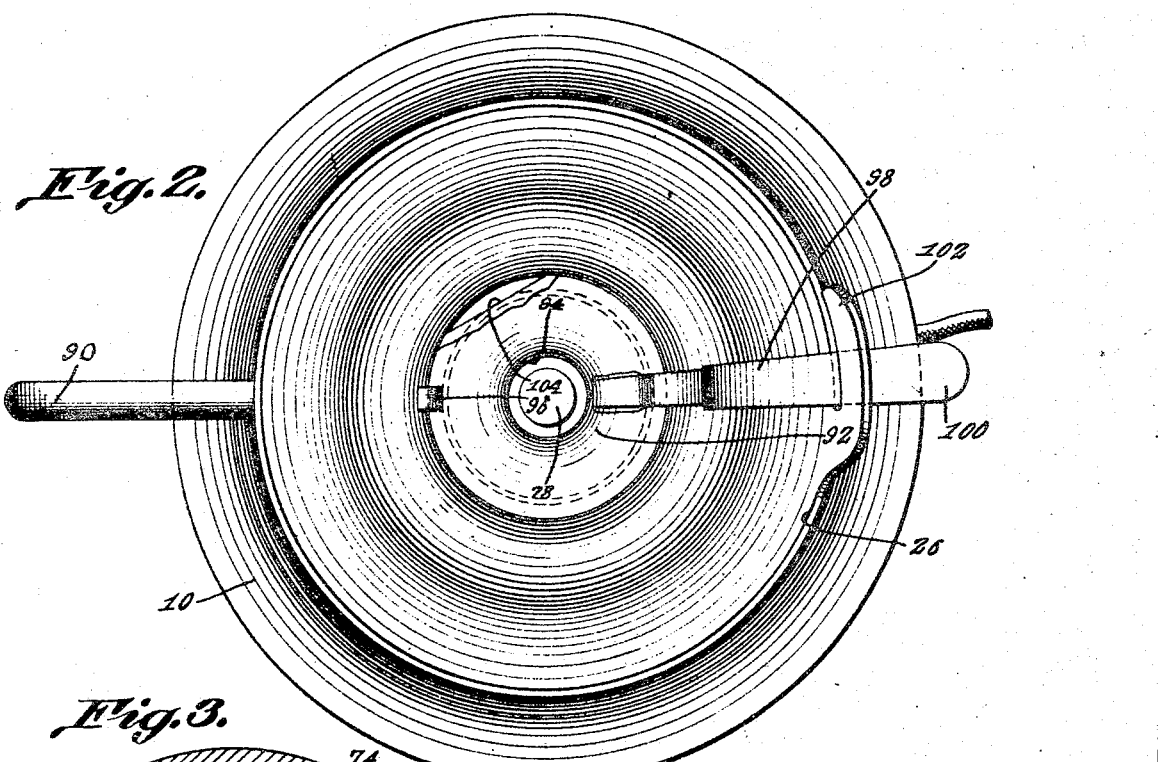
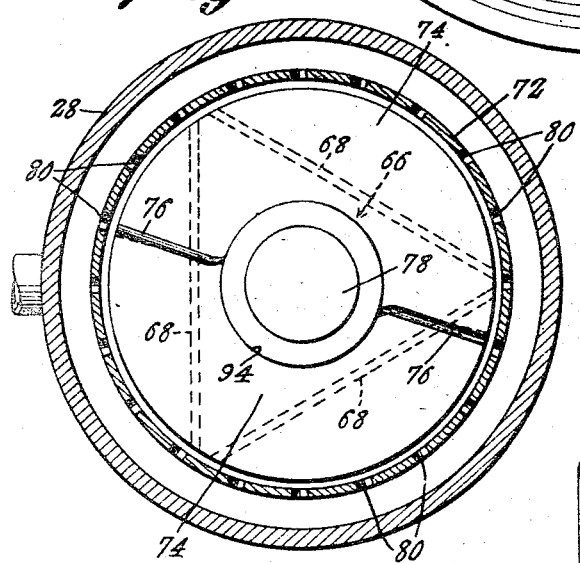
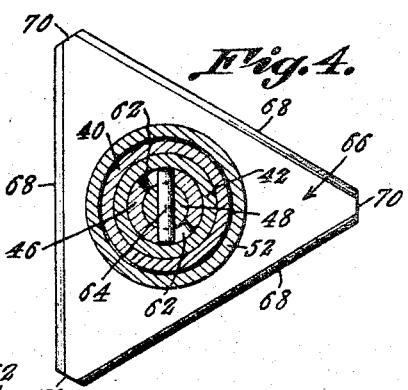
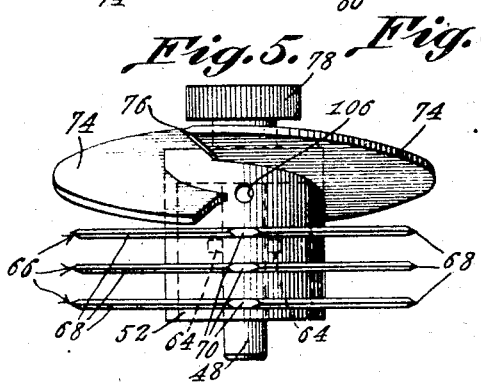
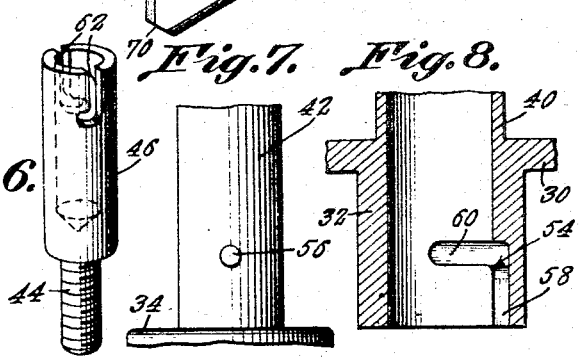
Herbert Fromm, INVENTOR
BY Victor J. Evans & Co.
ATTORNEYS Patented Apr. 29, 1941

2,240,213

UNITED STATES PATENT OFFICE 2,240,213

HOMOGENIZER

Herbert Fromm, Hamburg, Wis.

Application December 2, 1939, Serial No. 307,336

7 Claims. (Cl. 99—266)

My invention relates to the homogenization of fruit juices, vegetables, foods, mixed drinks, etc., and has among its objects and advantages the provision of an improved homogenizer.

In the accompanying drawings:

Figure 1 is a vertical sectional view of my invention illustrating the motor and certain shafts in elevation;

Figure 2 is a top plan view with a small fragment removed for the sake of clearness;

Figure 3 is a sectional view along the line 3—3 of Figure 1;

Figure 4 is a sectional view along the line 4—4 of Figure 1;

Figure 5 is an elevational view of a gang of blades and feeder elements which are rotated as a unit for reducing the material to a homogeneous mass;

Figure 6 is a perspective view of one element of the drive connection between the motor and the unit illustrated in Figure 5;

Figures 7 and 8 illustrate fragments of a mount for the drive part of Figure 6 and the unit of Figure 5; and Figure 9 is an enlarged sectional detail view illustrating the drive connection between the motor and the gang of blades and feeder elements.

In the embodiment selected to illustrate my invention, I make use of a housing 10 constituting a base and within which I mount a motor 12, which motor is positioned vertically and fixedly secured inside the housing through the medium of screws 14 which pass through lugs 16 having engagement with the motor for holding the latter centrally of the housing, with the screws 14 threaded into the wall of the motor. Housing 10 may be provided with pads 18. Housing 10 is provided with a neck 20 having a bore 22 coaxially related to the drive shaft 24 of the motor 12.

Upon the neck 20 I mount a bowl or hopper 26 having a cup-shaped bottom section 28 provided with a flat bottom 30 which rests on the neck 20. Bottom 30 carries a depending tube 32 which fits snugly inside the bore 22, and the end of the tube lies adjacent a boss 34 fashioned integrally with the end plate 36 attached to the shell 12 of the motor by means of screws 38.

Projecting upwardly from the bottom 30 is a tube 40, which tube has an inside diameter common to the inside diameter of the tube 32. Boss 34 is provided with a tube 42 which fits inside the tubes 32 and 40, with its upper end terminating in a common plane with the upper end of the tube 40. Motor shaft 24 rotates inside the tube 42 and has threaded connection with a threaded shank 44 of a shaft 46, which is preferably of tube-like formation into which I insert a shaft 48 fixedly connected with the end wall 50 in a sleeve 52 fitting loosely on the tube 40, and preferably spaced slightly therefrom, with the upper ends of the tube 40 and the tube 42 normally engaging the wall 50 when the machine is inactive.

Referring to Figs. 7 and 8, the tube 32 is provided with a bayonet slot 54 for coaction with a pin 56 carried by the sleeve 42 for connecting the two tubes against relative endwise movement. Tube 32 is easily slipped over the tube 42 by bringing the pin 56 into alignment with the vertical run 58 of the bayonet slot 54, and the tube 32 is rotated to bring the pin 56 into the horizontal run 60 of the bayonet slot, which holds the cup 28 in assembled relation with the neck 20 so as to prevent accidental disconnection. Similarly, the shaft 46, best illustrated in Fig. 6, is provided with bayonet slots 62 for the reception of pins 64 carried by the shaft 48, which pins are best illustrated in Fig. 5. Thus, the sleeve 52 may be inserted over the tube 40 and the pins 64 on the shaft 48 will connect the shaft with the shaft 46 to prevent endwise separation of the two shafts. It will thus be seen that the bowl 26 may be easily removed and replaced by reason of the pin 56 and the bayonet slot 54, and that the sleeve 52 is easily removed and replaced and when replaced the pins 64 establish a driving connection between the sleeve and the shaft 46 by reason of the pins 64 and the bayonet slots 62. At the same time, sleeve 52 is rotated through the medium of the connected motor shaft 24, the shaft 46 and the shaft 48.

Referring to Figs. 4 and 5, the sleeve 52 is provided with a series of blades 66 which are spaced vertically, and the blades are preferably of triangular configuration, as when viewing Fig. 4, with each blade provided with three cutting edges 68 and the ends 70 of the blades spaced closely to a cage wall 72 located inside the cup 28. Blades 66 are fixedly connected with the sleeve 52 for rotation therewith as a unit, and the sleeve is provided with a plurality of spirally fashioned blades 74 each having a cutting edge 76 at its leading end. Blades 74 are also fixedly connected with the sleeve 52, and the sleeve is provided with a knurled knob 78 to facilitate handling and connection and disconnection of the pins 64 with respect to the bayonet slots 62 in the shaft 46. Spiral blades 74 function as a feeder for moving material downwardly inside the cup 28 and into the cutting zones of the blades 66 in addition to performing a cutting function because of the edges 76.

Cage wall 72 is perforated, as illustrated at 80 in Figs. 1 and 3, and the wall is formed integrally with a bottom 82 having a tubular neck 84 fitting snugly on the tube 40 and upon the bottom 30 of the cup 28. Fig. 1 illustrates the wall 72 as being provided with a flange 86 fitting snugly against the wall of the cup 28, and the cage wall 72 is of smaller diameter than the inside diameter of the cup 28 to provide a space 88 for the reception of treated material passing through the perforations 80, which treated material is withdrawn from the cup 28 through the medium of a spout 90.

Above the flange 86 I position a plate 92 having such diameter as to fit snugly inside the cup 28, and the plate is provided with a central opening 94 in addition to being conically shaped and inverted to provide a throat-like configuration which deposits material to be treated directly over the knob 78 or centrally of the blades 66 and 74. Plate 92 is inserted underneath a lug 96 welded to the bowl 26, and the plate is provided with a handle 98 bent into the shape of an ogee curve, with its horizontal run 100 arranged to be located underneath an ear 102 extending above the bowl 26. Handle 98 firmly secures the plate 92 in position, and the plate is positioned by inserting its edge underneath the lug 96 and pivoting the plate downwardly on to the flange 86, after which the handle 98 is flexed slightly downwardly and pressed underneath the ear 102 which exerts a pressure on the plate and presses the neck 84 firmly against the wall 30. A portion of the flange 86 is cut away at 104, see Fig. 2, so that the cup may be inserted into and removed from the cup 28 past the lug 96.

From the foregoing description of the various parts of the device, the operation thereof will be readily understood. Sleeve 52, which carries the blades 66 and 74, is rotated at a high speed. The blades 74 constitute feeder knives which cut the material being homogenized in addition to positively moving the gravitating mass downwardly of the blades 66 which perform the greater part of cutting of the material and exhausting of the same through the perforations 80. The straight blades 66 perform efficiently when homogenizing fruit juices and semifluid-like masses, while the blades 74 are particularly adapted to the severing and reduction of vegetables to be finally homogenized by the blades 66. Many fruit juices are characterized by solids and unbroken juice cells. The reduction action of the bladed unit is such as to reduce the juices into a homogeneous mass devoid of solids which are present in fruit juices extracted in the conventional manner. Reduction of the solids provides a juice which is smoother and easier to drink, sweeter and more pleasing to the taste.

My device functions efficiently to reduce such vegetables as spinach, carrots, pineapple, beans, peas, pumpkins, berries of all varieties, etc., to a semifluid and homogeneous mass, in addition to functioning efficiently for the preparation of mixed drinks wherein fruit solids and the like are mixed with liquids. The device also functions efficiently in the processing of soups. Vegetables to be homogenized are boiled for a short period of time after which they are easily broken up and reduced to a homogeneous mass. Material to be reduced to a homogeneous mass should contain a percentage of water or other liquid content, such as is contained in all canned foods.

Sleeve 52 is provided with an opening 106 adjacent its end wall 50. This opening functions to exhaust moisture accumulating inside the sleeve 52 during rotation thereof. By reason of the opening 106, moisture is prevented from leaking downwardly of the motor shaft. With the sleeve 52 inactive, its end wall 50 rests on the ends of the tubes 40 and 42 so as to establish a seal against the passage of moisture to the motor shaft. However, at high speeds the sleeve 52 has a tendency to lift slightly, but the opening 106 functions to exhaust any moisture which passes into the sleeve 52 so that the motor shaft will be maintained in a dry condition during periods of operation as well as when the device is inactive. Such exhausting also eliminates soiling of the foods being treated which might otherwise occur if such materials were to contact the rotary shaft structure of the device. Sleeve 52 is spaced from the tube 40 so as to eliminate metal to metal contact and wear of these parts which are directly contacted by the material being homogenized.

The device is easily cleaned by reason of the detachable features. Bowl 26 may be removed by merely imparting a slight rotation thereto and lifting the tube 32 out of the bore 22 in the neck 20. Before such removal the sleeve 52 is disconnected from the shaft 46 which permits the bowl to be lifted. Plate 92 is easily removed to permit removal of the sleeve 52 and its attached blades, and the cage represented by the cage wall 72 and its bottom 82 may be removed from the bowl. Thus, all the parts of the device may be disassembled to facilitate cleaning thereof.

Having thus described certain embodiments of my invention in detail, it is, of course, understood that I do not desire to limit the scope thereof to the exact details set forth except insofar as those details may be defined in the appended claims.

I claim:

1. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage inside said bowl and spaced from the side walls of the bowl, a discharge spout carried by said bowl and communicating with the space between the cage and the side walls of said bowl, a fixed tube extending into said tube means and detachably connected with the latter for holding the bowl assembled with said support, and a bladed homogenizing unit located inside said cage and detachably connected with said drive shaft.

2. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage inside said bowl and spaced from the side walls of the bowl, a discharge spout carried by said bowl and communicating with the space between the cage and the side walls of said bowl, a fixed tube extending into said tube means and detachably connected with the latter for holding the bowl assembled with said support, a bladed homogenizing unit located inside said cage and detachably connected with said drive shaft, and feeder blade means carried by said bladed homogenizing unit.

3. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage inside said bowl and spaced from the side walls of the bowl, a discharge spout carried by said bowl and communicating with the space between the cage and the side walls of said bowl, a fixed tube extending into said tube means and detachably connected with the latter for holding the bowl assembled with said support, a bladed homogenizing unit located inside said cage and detachably connected with said drive shaft, and a plate located inside said bowl at the top of said cage and having a central opening coaxially related to the axis of rotation of said bladed homogenizing unit.

4. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage inside said bowl and spaced from the side walls of the bowl, a discharge spout carried by said bowl and communicating with the space between the cage and the side walls of said bowl, a fixed tube extending into said tube means and detachably connected with the latter for holding the bowl assembled with said support, a bladed homogenizing unit located inside said cage and detachably connected with said drive shaft, feeder blade means carried by said bladed homogenizing unit, a plate located inside said bowl at the top of said cage and having a central opening coaxially related to the axis of rotation of said bladed homogenizing unit, and resilient means coacting on said plate and said bowl for urging the plate against said cage for fixedly relating the cage to the bowl.

5. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage located inside said bowl and spaced from the side walls of said bowl, a discharge spout carried by said bowl and communicating with the space between said cage and the side walls of said bowl, a fixed tube extending into said tube means, said tube means being detachably connected with said fixed tube for removably holding the bowl in assembled relation with said support, a sleeve inserted over a portion of said tube means and having an end wall normally resting on said tube means, said sleeve having a loose fit with respect to the embraced portion of said tube means to provide a space therebetween, a detachable connection between said sleeve and said drive shaft, a gang of homogenizing blades carried by said sleeve, and feeder blade means carried by said sleeve, said sleeve being provided with a moisture exhausting opening adjacent said end wall, said sleeve being lifted under rotation for spacing said end wall slightly from the end of said tube means.

6. A homogenizer comprising a support, a vertical drive shaft, a bowl mounted on said support and provided with a vertical tube means at its bottom coaxially aligned with said drive shaft, said support being provided with a bore to receive a portion of said tube means, a perforated cage located inside said bowl and spaced from the side walls of said bowl, a discharge spout carried by said bowl and communicating with the space between said cage and the side walls of said bowl, a fixed tube extending into said tube means, said tube means being detachably connected with said fixed tube for removably holding the bowl in assembled relation with said support, a sleeve inserted over a portion of said tube means and having an end wall normally resting on said tube means, said sleeve having a loose fit with respect to the embraced portion of said tube means to provide a space therebetween, a detachable connection between said sleeve and said drive shaft, a gang of homogenizing blades carried by said sleeve, feeder blade means carried by said sleeve, said sleeve being provided with a moisture exhausting opening adjacent said end wall, said sleeve being lifted under rotation for spacing said end wall slightly from the end of said tube means, a plate inside said bowl and extending across the top of said cage, said plate being provided with a feeding opening coaxially arranged with respect to the axis of rotation of said sleeve, and resilient means coacting on said plate and said bowl for urging the plate against said cage to fixedly relate the latter to said bowl.

7. A homogenizer comprising a housing, a motor inside the housing and anchored to the latter and provided with a vertical drive shaft, a hopper mounted on said housing and provided with a bottom having a depending tube and an upstanding tube coaxially related thereto, said housing being provided with a bore to receive said depending tube and the bottom of the hopper resting on said housing, a fixed tube carried by said motor and extending into said depending tube, a detachable connection between said fixed tube and said depending tube for removably holding the hopper in assembled relation with said housing, a perforated cage inside said hopper at its bottom and provided with a central opening for the reception of said upstanding tube, said cage being spaced from the side walls of said hopper and the latter being provided with a discharge spout communicating with the space between the cage and the side walls of the hopper, a sleeve inserted on said upstanding tube and having an end wall normally engaging said upstanding tube, a shaft fixed to said end wall and detachably connected with said drive shaft, homogenizing blades fixed to said sleeve for rotation therewith, said sleeve being provided with a moisture exhausting opening adjacent said end wall and said sleeve having clearance with respect to said upstanding tube, and feeder blades fixed to said sleeve for rotation therewith and arranged to move material to be homogenized into the zone of said first-mentioned blades, said sleeve having limited vertical freedom with respect to said drive shaft to permit vertical movement of the sleeve to bring said end wall out of engagement with said upstanding tube during rotation of the sleeve.

HERBERT FROMM.